(12) United States Patent
Pisoni et al.

(10) Patent No.: US 12,398,712 B2
(45) Date of Patent: Aug. 26, 2025

(54) LUBRICANT PUMP SYSTEM WITH RAPID COUPLING RESERVOIR

(71) Applicants: AKTIEBOLAGET SKF, Gothenburg (SE); Osakeyhtiö SKF Aktiebolag, Espoo (FI)

(72) Inventors: William Joseph Pisoni, Saint Louis, MO (US); Carl Patric Daniel Norin Jansson, Gothenburg (SE); Régis André Yves Page, Saumur (FR); Lauri Paavo Hermanni Maukonen, Muurame (FI)

(73) Assignees: AKTIEBOLAGET SKF, Gothenburg (SE); Osakeyhtiö SKF Aktiebolag, Espoo (FI)

( * ) Notice: Subject to any disclaimer, the term of this patent is extended or adjusted under 35 U.S.C. 154(b) by 320 days.

(21) Appl. No.: 17/847,517

(22) Filed: Jun. 23, 2022

(65) Prior Publication Data
US 2023/0417237 A1    Dec. 28, 2023

(51) Int. Cl.
*F04B 23/02* (2006.01)
*F04B 9/04* (2006.01)
(Continued)

(52) U.S. Cl.
CPC ............ *F04B 23/025* (2013.01); *F04B 9/045* (2013.01); *F04B 17/03* (2013.01);
(Continued)

(58) Field of Classification Search
CPC ...... F04B 15/023; F04B 23/02; F04B 23/025; F04B 23/026; F04B 53/1087; F04B 53/22; F16N 7/38–40
(Continued)

(56) References Cited

U.S. PATENT DOCUMENTS

| 1,571,845 A * | 2/1926 | Le Sbvre ............ F04B 23/026 |
| | | 74/569 |
| 1,575,755 A * | 3/1926 | Gresser .................. F16N 21/04 |
| | | 141/348 |

(Continued)

FOREIGN PATENT DOCUMENTS

| DE | 202006012999 U1 * | 1/2008 | ............. F03D 80/70 |
| DE | 202008000748 U1 * | 4/2008 | ............ F04B 23/026 |

(Continued)

*Primary Examiner* — Alexander B Comley
(74) *Attorney, Agent, or Firm* — J-TEK LAW PLLC; Scott T. Wakeman; Mark A. Ussai

(57) ABSTRACT

A lubricant pump system includes a pump assembly which has a housing with an interior pumping chamber having an inlet. At least one pumping unit is disposed at least partially within the pumping chamber and is configured to displace lubricant from the pumping chamber through an outlet. The housing has a pump interface with an opening fluidly coupleable with the pumping chamber inlet and a pump valve controlling lubricant flow through the pump interface opening. A reservoir includes a body connectable with the pump housing and having a central axis, an interior storage chamber for containing a quantity of lubricant and a reservoir interface engageable with the pump interface. The reservoir interface includes an opening fluidly coupleable with the storage chamber and fluidly coupleable with the pump interface opening. The reservoir body includes a reservoir valve controlling lubricant flow through the reservoir interface opening.

18 Claims, 17 Drawing Sheets

(51) Int. Cl.
*F04B 17/03* (2006.01)
*F04B 53/10* (2006.01)
*F04B 53/22* (2006.01)
*F16H 57/04* (2010.01)

(52) U.S. Cl.
CPC .......... *F04B 53/1087* (2013.01); *F04B 53/22* (2013.01); *F16H 57/0436* (2013.01)

(58) Field of Classification Search
USPC ................. 137/614.01–614.4; 222/372–385
See application file for complete search history.

(56) References Cited

U.S. PATENT DOCUMENTS

| | | | | |
|---|---|---|---|---|
| RE16,650 E | * | 6/1927 | Houghton | F16N 21/04 184/105.3 |
| 1,637,325 A | * | 7/1927 | Jacques | F16N 21/04 184/105.3 |
| 1,697,314 A | * | 1/1929 | Gresser | F16N 21/04 184/105.3 |
| 1,723,437 A | * | 8/1929 | Owens | F16N 21/04 184/105.3 |
| 1,787,439 A | * | 1/1931 | Fesler | F16N 21/04 137/614.04 |
| 1,796,833 A | * | 3/1931 | Davis | F16N 21/04 251/149.5 |
| 1,848,538 A | * | 3/1932 | Mudd | F16N 21/04 285/276 |
| 2,103,063 A | * | 12/1937 | Clark | F16N 19/00 222/325 |
| 2,258,636 A | * | 10/1941 | Young | F16N 13/08 222/145.8 |
| 2,258,637 A | * | 10/1941 | Young | F16N 5/00 222/530 |
| 3,972,387 A | * | 8/1976 | Braun | F16N 19/00 184/105.3 |
| 5,348,192 A | * | 9/1994 | Sardynski | B67D 1/0079 251/142 |
| 5,425,404 A | * | 6/1995 | Dyer | B67D 3/0029 222/145.5 |
| 6,149,037 A | * | 11/2000 | Berrend | F16N 7/00 222/326 |
| 6,244,387 B1 | * | 6/2001 | Paluncic | F16N 25/02 184/32 |
| 6,269,837 B1 | * | 8/2001 | Arent | B67D 7/0205 251/149.6 |
| 6,325,100 B1 | * | 12/2001 | Bunschoten | F16L 37/35 251/149.6 |
| 9,671,065 B2 | * | 6/2017 | Conley | F16N 29/00 |
| 10,697,336 B2 | * | 6/2020 | Dawson | F16N 19/003 |
| 10,774,830 B2 | * | 9/2020 | Lanie | F16N 7/38 |
| 2004/0129499 A1 | * | 7/2004 | Okpokowuruk | F16N 11/08 184/26 |
| 2008/0185226 A1 | * | 8/2008 | Saam | F16N 19/00 184/4 |
| 2011/0232785 A1 | * | 9/2011 | Takahashi | F01M 11/03 137/561 R |
| 2012/0132303 A1 | * | 5/2012 | Conley | F16N 29/02 137/565.17 |
| 2013/0092284 A1 | * | 4/2013 | Holland | F16N 13/02 222/251 |
| 2021/0404601 A1 | * | 12/2021 | Kuno | F16N 11/08 |

FOREIGN PATENT DOCUMENTS

EP 3739204 A1 11/2020
JP 4551213 B2 9/2010

* cited by examiner

LUBRICANT PUMP SYSTEM WITH RAPID COUPLING RESERVOIR

BACKGROUND OF THE INVENTION

The present invention relates to lubrication systems, and more particularly to pumps for lubrication systems.

Lubrication systems for providing lubricant to mechanical components such as bearings, gear trains, etc. typically include one or more pumps to direct lubricant from a reservoir to such mechanical components. Such pumps may either supply the lubricant to an intermediate delivery device, for example an injector, or supplies lubricant directly to the mechanical component by hoses or fluid lines. In certain applications, the reservoir is directly attached to a pump assembly and the reservoir must be periodically refilled. Typically, such refilling of the reservoir requires delivering the lubricant into the pump reservoir from an external resupply reservoir, generally by means of a hose attached to a fill port, such that a certain amount of maintenance time is required for such refilling operations.

SUMMARY OF THE INVENTION

In one aspect, the present invention is a lubricant pump system comprising a pump assembly including a housing with a central axis and an interior pumping chamber having an inlet. At least one pumping unit is disposed at least partially within the pumping chamber and is configured to displace lubricant from the pumping chamber through an outlet. The housing has a pump interface with an opening fluidly coupleable with the pumping chamber inlet and a pump valve controlling lubricant flow through the pump interface opening. A reservoir includes a body connectable with the pump housing and having a central axis, an interior storage chamber for containing a quantity of lubricant and a reservoir interface engageable with the pump interface. The reservoir interface includes an opening fluidly coupleable with the storage chamber and fluidly coupleable with the pump interface opening. Further, the reservoir body includes a reservoir valve controlling lubricant flow through the reservoir interface opening.

In another aspect, the present invention is again a lubricant pump system comprising a pump assembly including a housing with a central axis and an interior pumping chamber having an inlet. At least one pumping unit is disposed at least partially within the pumping chamber and is configured to displace lubricant from the pumping chamber through an outlet. The housing has a pump interface with an opening fluidly coupled with the pumping chamber inlet and a pump valve controlling lubricant flow through the pump interface opening and including a fixed valve seat and a movable valve plug. A reservoir includes a body connectable with the pump housing and having a central axis, an interior storage chamber for containing a quantity of lubricant and a reservoir interface engageable with the pump interface. The reservoir interface includes an opening fluidly coupled with the storage chamber and fluidly coupleable with the pump interface opening. Further, the reservoir body has a reservoir valve controlling lubricant flow through the reservoir interface opening and including a fixed valve seat and a movable valve plug. The reservoir valve plug contacts the pump valve seat and the reservoir valve seat contacts the pump valve plug when the reservoir interface engages with the pump interface. As such, relative displacement of the reservoir toward the pump assembly displaces both the reservoir valve plug and the pump valve plug generally along the central axis and fluidly couples the reservoir storage chamber with the pumping chamber.

In a further aspect, the present invention is yet again a lubricant pump system comprising a pump assembly including a housing with a central axis and an interior pumping chamber having an inlet. At least one pumping unit is disposed at least partially within the pumping chamber and is configured to displace lubricant from the pumping chamber through an outlet. The housing includes a main body portion providing the pumping chamber and an adapter block attached to the main body portion and an outer axial end providing a pump interface. The pump interface has an opening fluidly coupled with the pumping chamber inlet. A reservoir includes a body having a central axis, a tubular portion providing an interior storage chamber for containing a quantity of lubricant, and an adapter block releasably connectable with the pump adapter block to connect the reservoir with the pump assembly. The pump adapter block is attached to the tubular portion and has an outer axial end providing a reservoir interface engageable with the pump interface. Further, the reservoir interface has an opening fluidly coupled with the storage chamber and fluidly coupled with the pump interface opening when the reservoir interface is engaged with the pump interface, so as to fluidly connect the reservoir storage chamber with the pumping chamber.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
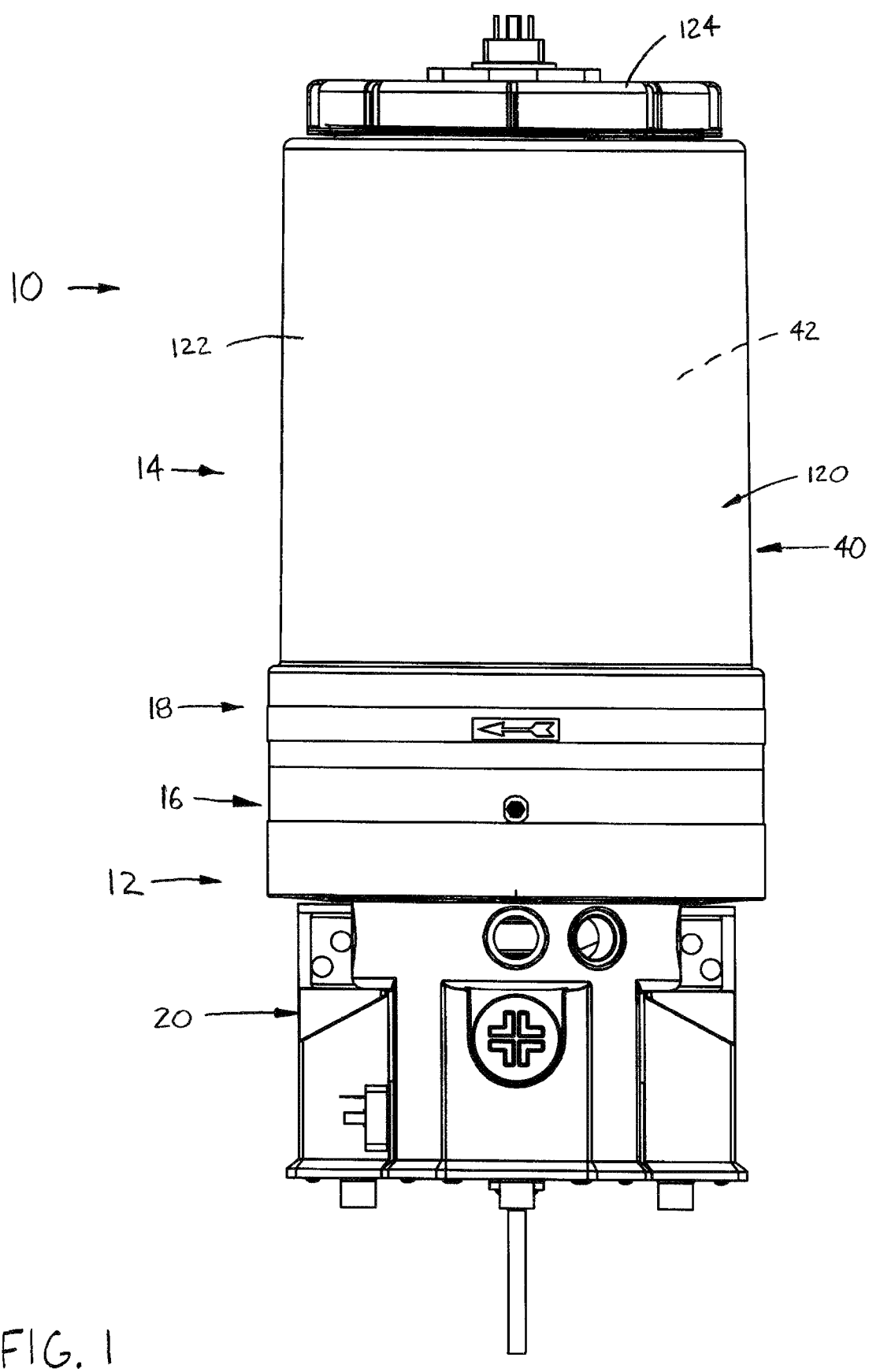
FIG. 1 is an elevational view of the lubricant pump system of the present invention.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-17 a lubricant pump system 10 for supplying lubricant, such as grease, within a lubrication system 1. The lubrication system 1 may also include one or more lubricant injectors 2 for delivering lubricant to a mechanical device 3, such a bearing 4, a gear train (not shown), etc., such that the pump system 10 directs lubricant to such injector(s) 2, as best shown in FIG. 2. Alternatively or additionally, the pump assembly 10 may directly supply the lubricant to the mechanical device(s) 3 through one or more hoses or fluid lines 5 and divider valves 6, as also shown in FIG. 2. The lubricant pump system 10 basically comprises a pump assembly 12 and a lubricant reservoir 14, and preferably includes a pump interface block 16 and a reservoir interface block 18, as described in detail below.

Figure 11:
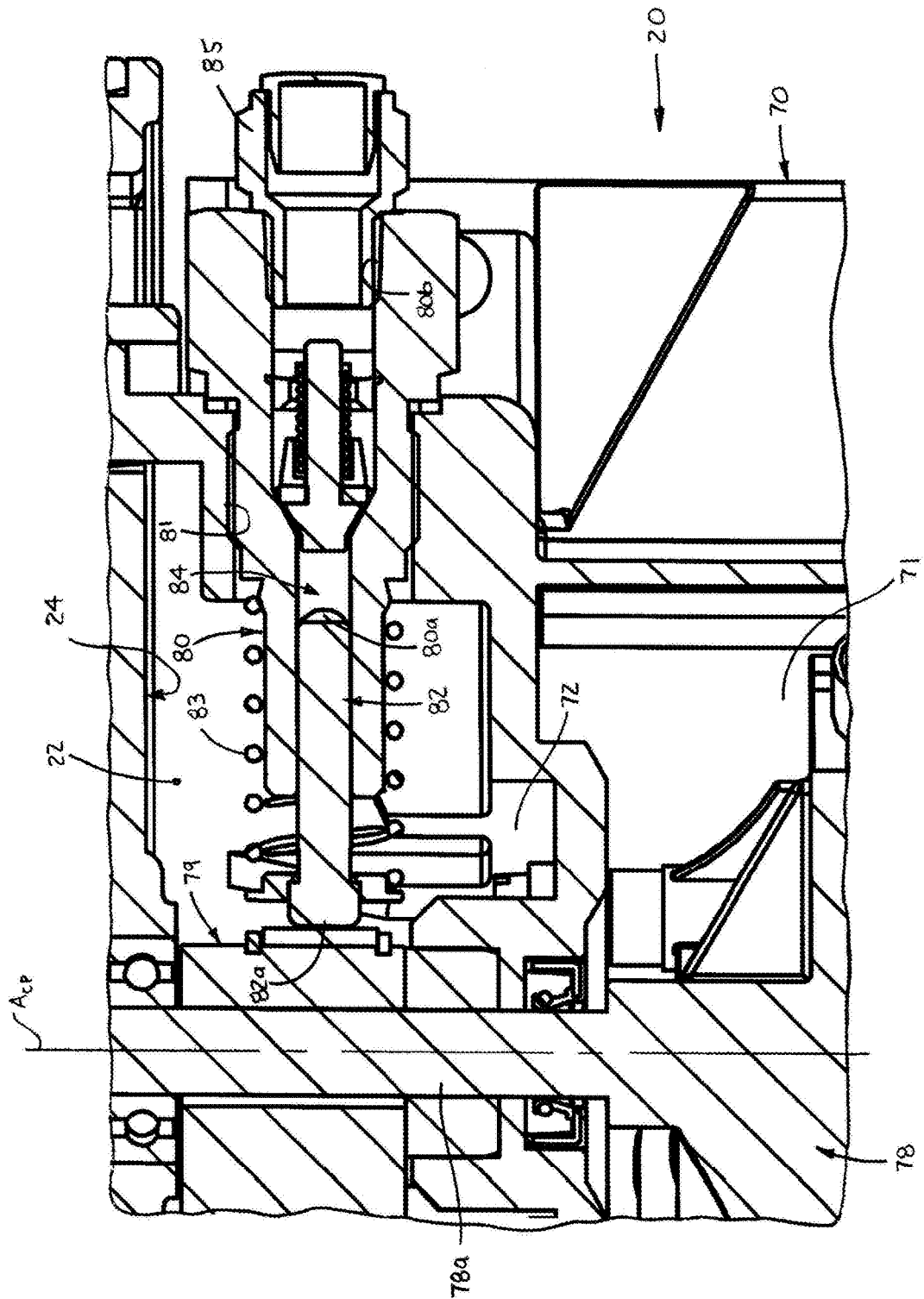
FIG. 11 is a broken-away, enlarged axial cross-sectional view of the pump assembly, showing an exemplary pumping unit.

More specifically, the pump assembly 12 includes a housing 20, the housing 20 having a central axis $A_{CP}$, an interior pumping chamber 22 with an inlet 24, and at least one and preferably a plurality of pumping units 26 (FIG. 11). The one or more pumping units 26 are each disposed at least partially within the pumping chamber 22 and are configured to displace lubricant from the pumping chamber 22 through an outlet 28, as described in further detail below. The housing 20 has a pump interface 30 with an opening 32 fluidly coupleable with the pumping chamber inlet 24 and preferably includes a pump valve 34 controlling lubricant flow through the pump interface opening 32.

Further, the reservoir 14 basically includes a body 40 connectable with the pump housing 20 and having a central axis $A_{CR}$, which is coaxial with the pump central axis $A_{CP}$ when the reservoir 14 is connected with the pump assembly 12, an interior storage chamber 42 for containing a quantity of lubricant and a reservoir interface 44 engageable with the pump interface 30. The reservoir interface 44 includes an opening 46 fluidly coupleable with the storage chamber 42 and fluidly coupleable with the pump interface opening 32. Also, as with the pump housing 20, the reservoir body 40 preferably includes a reservoir valve 48 controlling lubricant flow through the reservoir interface opening 46.

With the basic structure above, the pump valve 34 seals the pump interface opening 32 and the reservoir valve 48 seals the reservoir interface opening 46 when the reservoir 14 is separate from the pump assembly 12. As such, lubricant is retained within the reservoir 14 by the reservoir valve 48 and the pump valve 34 both prevents any lubricant from leaking from the pump housing 20, or perhaps more significantly, substantially prevents air from entering into the pumping chamber 22. Further, the reservoir valve 48 interacts with the pump valve 34 when the reservoir interface 44 engages with the pump interface 30 so as to open both the pump interface opening 32 and the reservoir interface opening 46, thereby fluidly connecting the reservoir storage chamber 42 with the pumping chamber 22, as discussed below, for subsequent delivery to the injector(s) 2 or directly to the mechanical device(s) 3.

Furthermore, the pump assembly 12 or/and the reservoir 14 includes at least one connector 50 (FIGS. 12 and 13) configured to releasably connect the reservoir 14 with the pump assembly 12, thereby maintaining engagement of the reservoir and pump interfaces 44, 30. Preferably, each one of the interface blocks 16, 18 has components of a bayonet connection, as described in detail below, to releasably connect the reservoir 14 with the pump assembly 12. However, the reservoir 14 and the pump assembly 12 may be releasably connected by any other appropriate means, such as for example, by one or more clamps (none shown) attached to the pump assembly 12 and engageable with the reservoir 14, etc.

Referring to FIGS. 7-10, the pump valve 34 preferably includes a fixed valve seat 35 and a movable valve plug 37. The valve plug 37 is engageable with the pump valve seat 35 so as to close the pump interface opening 32 and is displaceable or "space-able" from the seat 35 to allow lubricant flow through the opening 32. Similarly, the reservoir valve 48 includes a fixed valve seat 47 and a movable valve plug 49 engageable with the pump valve seat 47. As such, the reservoir interface opening 46 is closed or sealed when the plug 49 engages the seat 47 and is open when the plug 49 is spaced or displaced from the seat 47.

Figure 10:
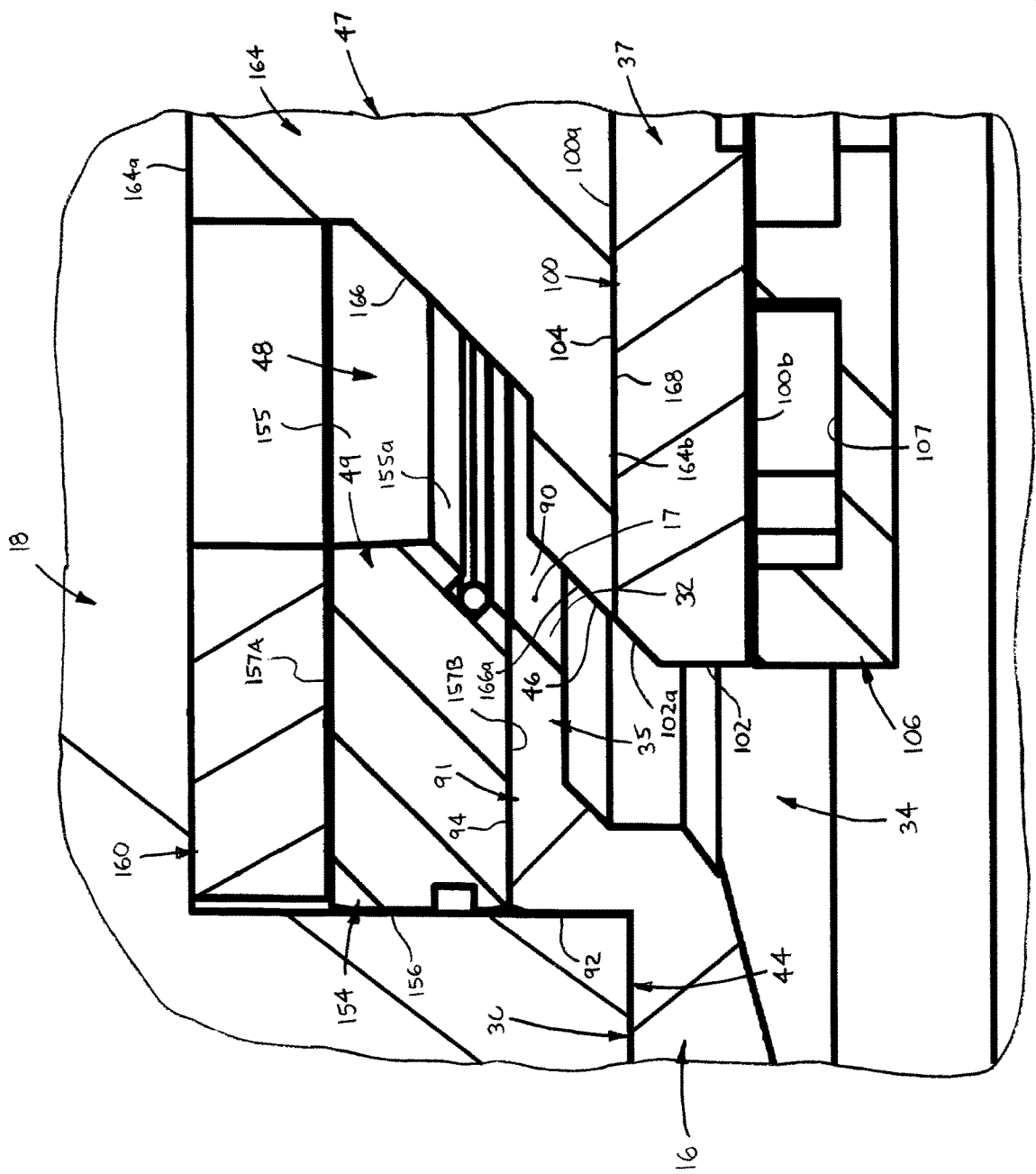
FIG. 10 is a more enlarged view of a portion of FIG. 9, showing a flow passage through a reservoir valve and pump valve.

With the above-described structure of the two valves 34, 48, the reservoir valve plug 49 contacts the pump valve seat 35 and the reservoir valve seat 47 contacts the pump valve plug 37 when the reservoir interface 44 engages with the pump interface 30. As such, further relative displacement of the reservoir 14 toward the pump assembly 12 displaces both the reservoir valve plug 49 (i.e., from the seat 47) and the pump valve plug 37 (from seat 35) generally along the central axes $A_{CP}$, $A_{CR}$ and fluidly couples the reservoir chamber 42 with the pumping chamber 22, i.e., through the fluidly connected interface openings 32, 46. Specifically, an annular passage 17 is defined between the reservoir valve seat 47 and the pump valve seat 35 when the reservoir 14 is connected with the pump assembly 12, as best shown in FIG. 10, the passage 17 fluidly coupling the reservoir storage chamber 42 with the pumping chamber 22.

Figure 6:
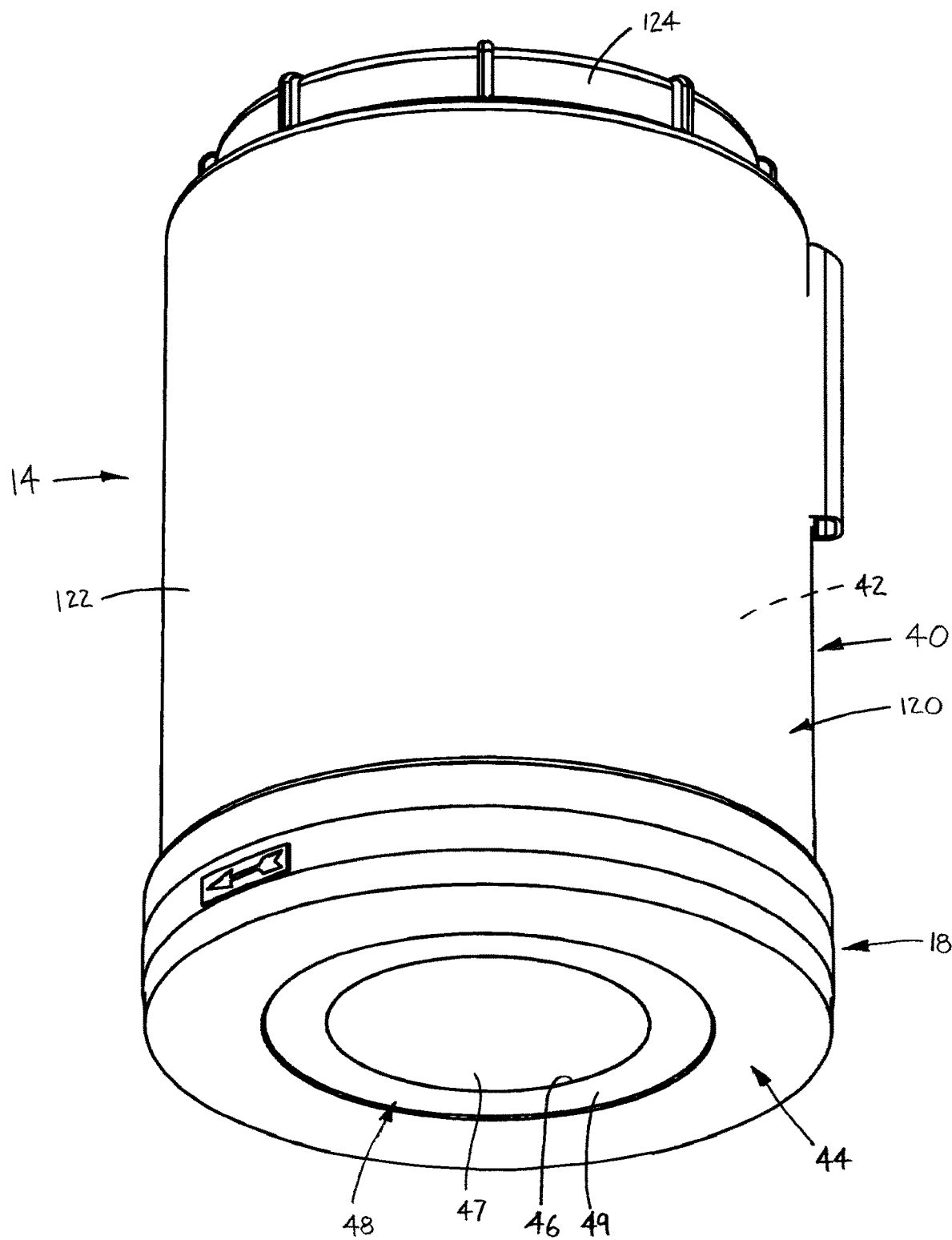
FIG. 6 is a perspective view from the bottom of the reservoir.
Figure 7:
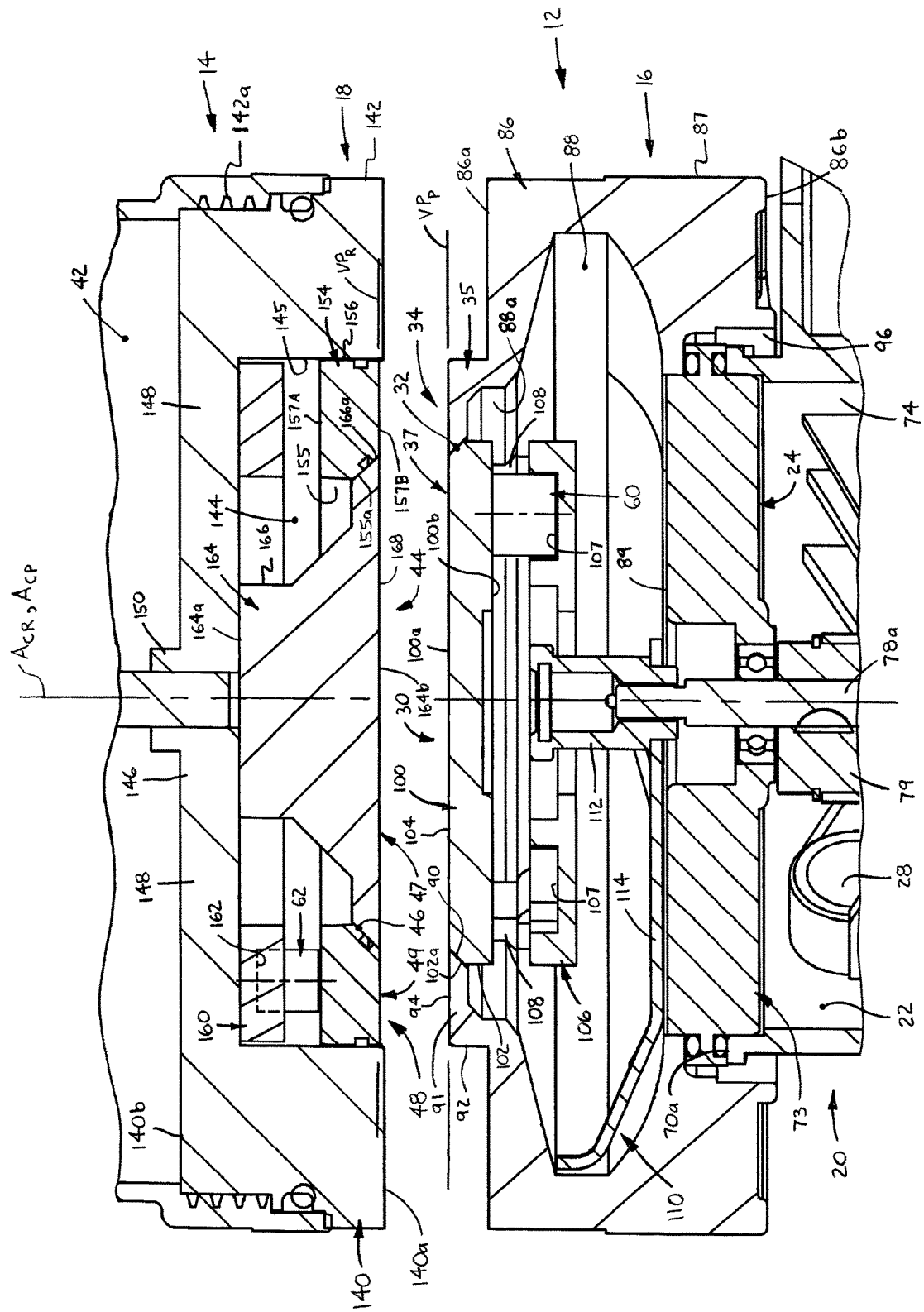
FIG. 7 is a broken-away, enlarged axial cross-sectional view of the lubricant pump system, showing a reservoir interface spaced from a pump interface.

Referring to FIG. 7, each one of the pump valve 34 and the reservoir valve 48 preferably further includes at least one and preferably a plurality of biasing members 60, 62, respectively, (only one each shown) configured to bias each respective valve plug 37, 49 to the closed positions shown in FIGS. 4-8. Specifically, the one of more biasing members 60 are disposed within the pump housing 20 and are configured to bias the pump valve plug 37 axially against the pump valve seat 35, so as to thereby prevent lubricant flow through the pump valve seat 35 (i.e., through interface opening 30) when the pump assembly 12 is separate from the reservoir 14. Likewise, the biasing member(s) 62 of the reservoir valve 48 are configured to bias the reservoir valve plug 49 axially against the reservoir valve seat 47, thereby preventing lubricant flow through the valve seat 49/interface opening 46 when the reservoir 14 is separate from the pump assembly 12. Thus, both valves 34, 48 are normally closed when each of the primary system components 12, 14 are separate from each other, but preferably interact with each other to fluidly connect the interface openings 32, 46, and thus fluidly couple the reservoir storage chamber 42 with the pumping chamber 22, simultaneously with engagement of the pump and reservoir interfaces 30, 44.

Consequently, the lubricant system 10 of the present invention enables a substantially immediate resupply of lubricant to the pump assembly 12 merely by pushing the reservoir interface 44 into engagement with the pump interface 30, and the lubricant pump system 10 is thereafter fully operational simply by securing the reservoir 14 to the pump assembly 12 as discussed above and in further detail below. Having described the basic structure and functions above, these and other elements of the present lubricant pump system 10 are described in further detail below.

Figure 3:
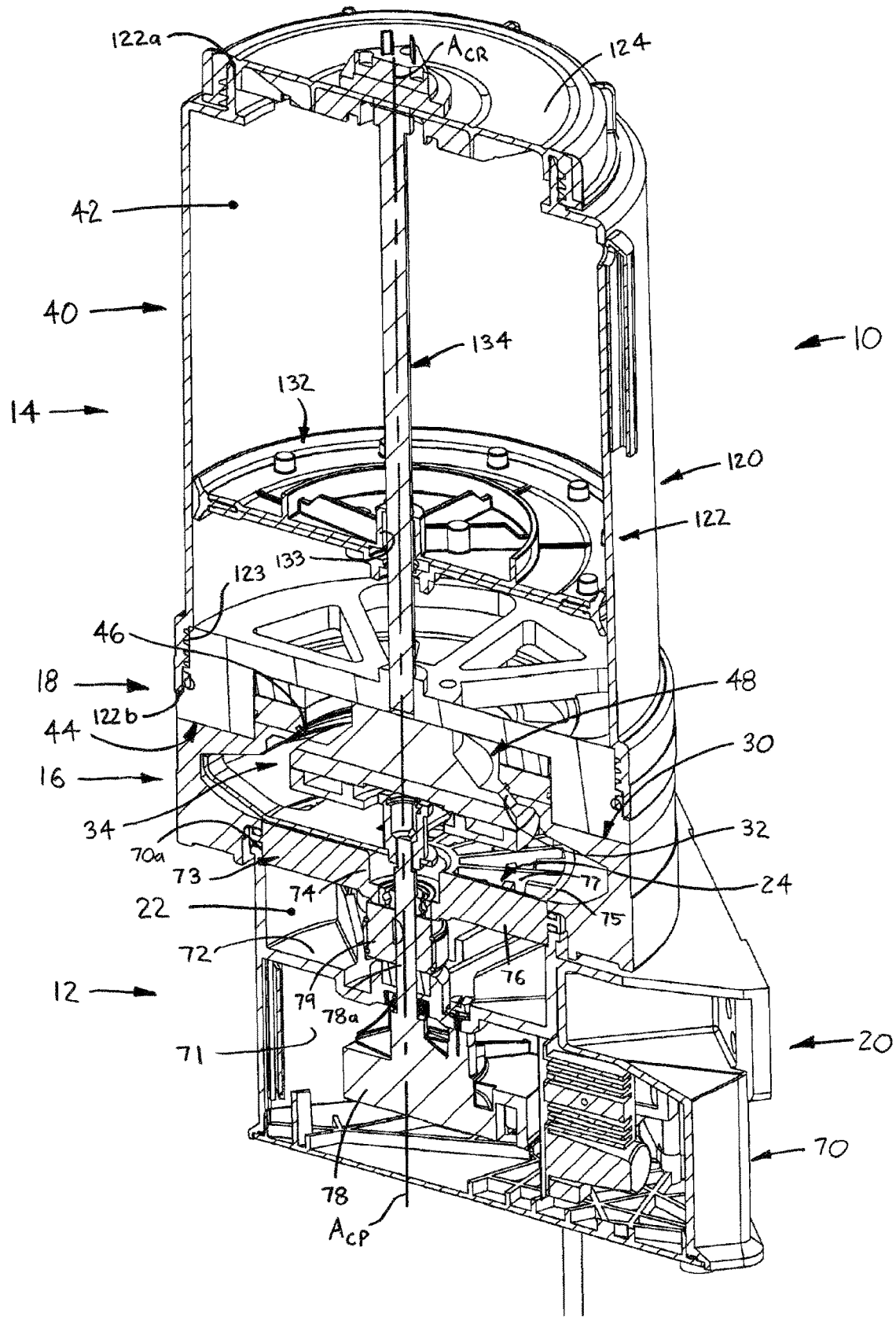
FIG. 3 is an axial cross-sectional view in perspective of the lubricant pump system.
Figure 4:
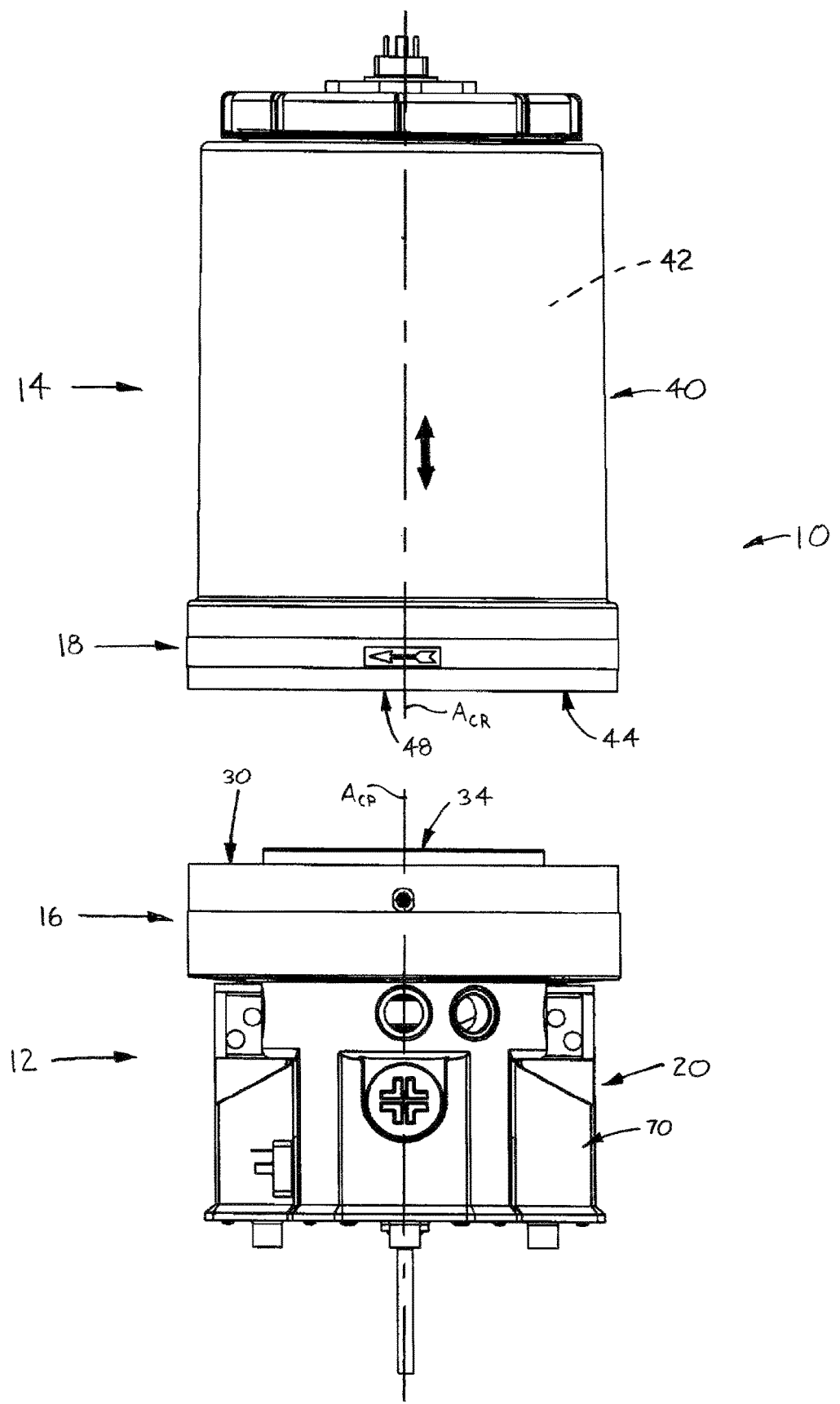
FIG. 4 is a front elevational view of the lubricant pump, showing a reservoir separate from a pump assembly.
Figure 5:
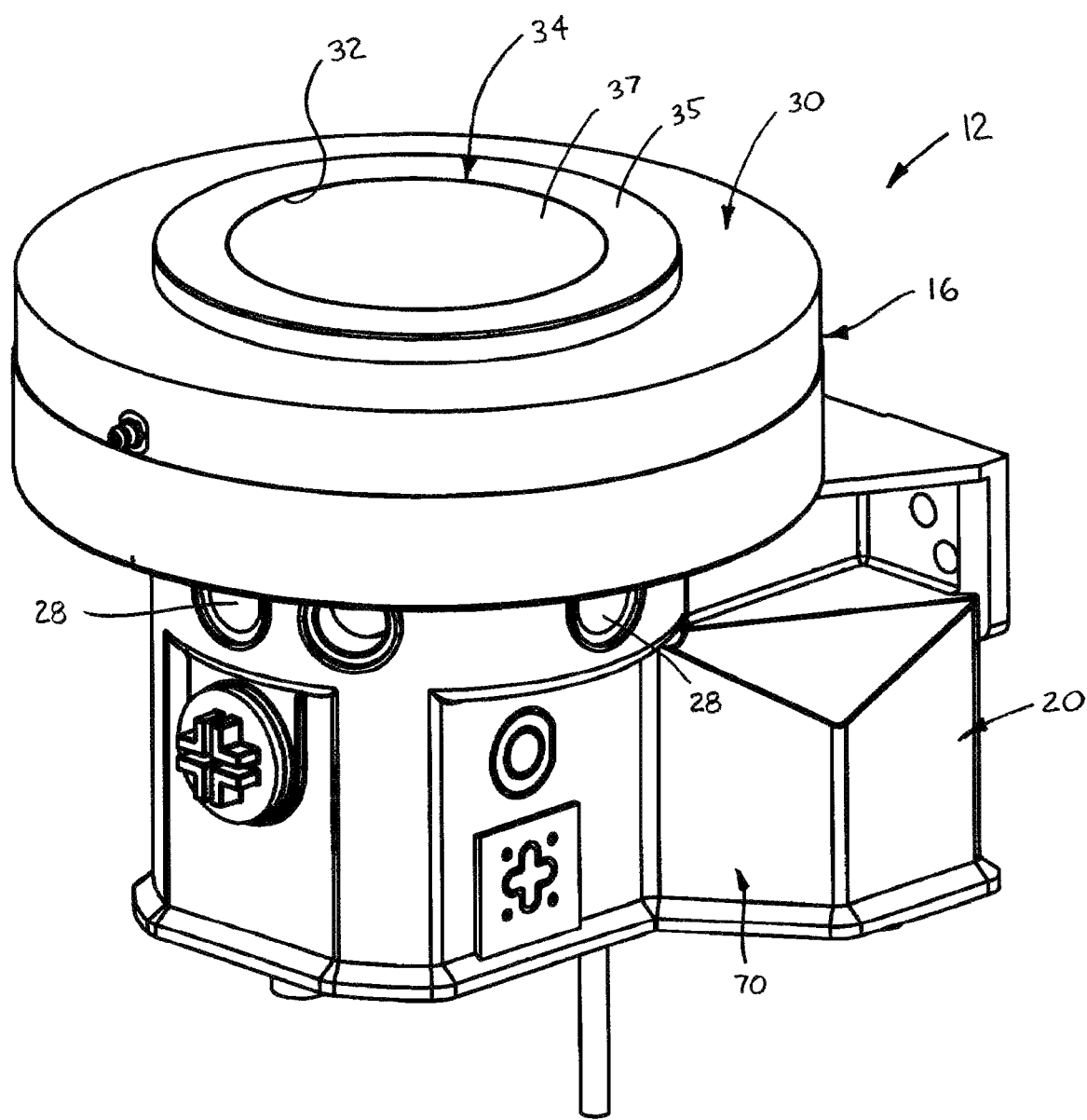
FIG. 5 is a perspective view from the top of the pump assembly.

Referring now to FIGS. 3, 6-9 and 11, the pump housing 20 preferably includes a main body portion 70 and the pump interface block 16, as mentioned above. The main body portion 70 provides the pumping chamber 22 and contains or houses the one or more pumping units 26. Preferably, the main body portion 70 is complex-shaped and includes a lower cavity 71, an upper cavity 72 providing the pumping chamber 22 and an upper circular flow plate 73 attached to an upper end 70a of the main body portion 70. The flow plate 73 has a central hub 74, an outer rim 75 and a plurality of radial flanges 76 connecting the rim 75 to the hub 74 and defining a plurality of flow ports 77 collectively providing the pump inlet 24, as best shown in FIG. 3.

In a presently preferred embodiment, the pump assembly 12 includes a motor 78 disposed within the lower cavity 71 of the main body portion 70, along with related drive components (none indicated), and has a shaft 78a extending along the pump central axis $A_{CP}$. An eccentric drive member or "cam" 79 is disposed on the motor shaft 78a and within the pumping chamber 22, and at least one and preferably a plurality of the pumping units 26 are arranged about the drive member 79. Referring particularly to FIG. 11, each pumping unit 26 preferably includes a cylindrical sleeve 80 extending through an opening 81 in the housing main body portion 70, a piston 82 disposed within the sleeve 80 and a spring 83. Specifically, each sleeve 80 has a central passage 84, an inlet 80a disposed within the pumping chamber 22 and an outlet 80b providing one pump outlet 28, which is connectable with a hose or other fluid line 4, preferably by means of a coupler 85. Each piston 82 is slidably disposed within the sleeve central passage 84 and has an outer end 82a biased by the spring 83 into engagement with the eccentric drive member 79.

As such, rotation of the drive member 79 reciprocates the piston 82 to alternatively draw lubricant into the central passage 84 when displaced toward the drive member 79 by the spring 83, and then to direct lubricant within the passage 84 through the sleeve outlet 80b when displaced or pushed by the drive member 79 toward the outlet 80b. Although the plurality of pumping units 26 as described above are presently preferred, the pump assembly 12 may include at least one pumping unit 26 formed in any other appropriate manner, such as for example a centrifugal pump or another type of positive displacement pump. The lubricant pump system 10 of the present invention is in no manner limited to any specific structure of the pumping unit(s) 26 or to any other pumping elements for directing and/or pressurizing lubricant.

Referring now to FIGS. 7-9 and 14, the pump interface block 16 preferably includes a circular cylindrical body 86 having an outer axial end 86a providing the pump interface 30, an inner axial end 86b attached to the upper end 70a of the housing main body portion 70, and an outer circumferential surface 87. The body 86 of the interface block 16 has an interior cavity 88 and an inner opening 89 through the body inner axial end 86b. The inner opening 89 is fluidly coupled with the pump inlet 24, to thereby fluidly connect the interface block interior cavity 88 with the pumping chamber 22. Also, the interface block body 86 further has an inner circumferential surface 90 extending axially inwardly from the outer axial end 86a to the interior cavity 88. The inner circumferential surface 90 is preferably frustoconical, defines the pump interface opening 32 and provides the pump valve seat 35.

Preferably, the body 86 of the pump interface block 16 further has a central annular projection 91 extending outwardly from the outer axial end 80a and providing the valve seat 35, and thus also the inner circumferential surface 90. The projection 91 also has an outer circumferential surface 92 disposeable within the reservoir block 18, as discussed below, and a flat outer annular surface 94. Further, the reservoir block body 86 preferably has a counterbore section 96 extending inwardly from the inner axial end 80b and sized to receive a portion of the upper end 70a of the pump housing main body portion 70, as well as the flow plate 73 mounted thereto, so as to removably connect the pump interface block 16 with the main body portion 70 of the pump housing 20. As such, the pump interface block 16 preferably functions as an adapter block and is configured to connect with a conventional, most preferably commercially available, pump. However, the interface block 16 may alternatively be fabricated as an integral component of the pump assembly 12 and connected or integrally formed with the remainder of the pump housing 20 by any appropriate means.

Figure 12:
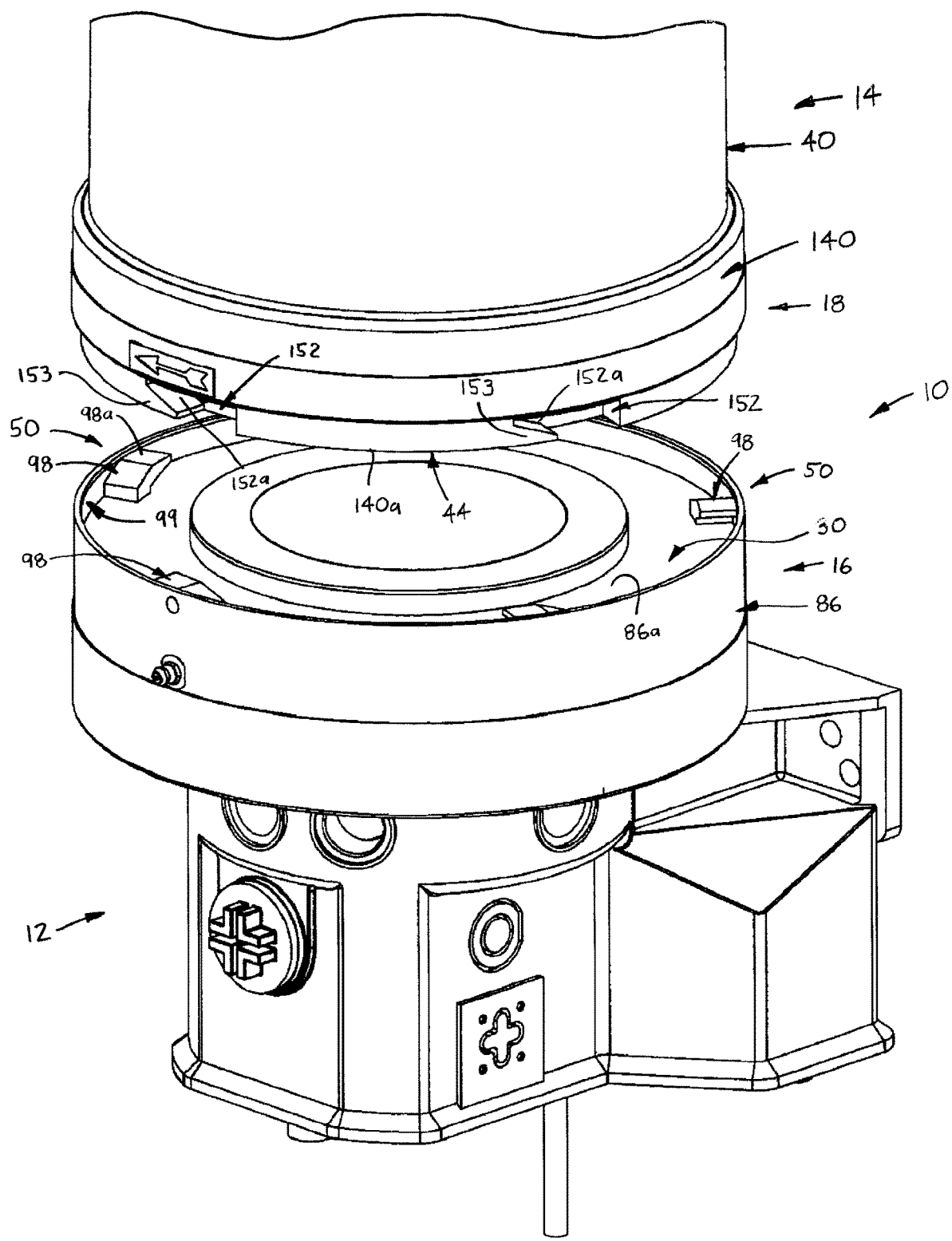
FIG. 12 is a broken-away perspective view of the lubricant pump system, showing a plurality of connectors being positioned for engagement.
Figure 13:
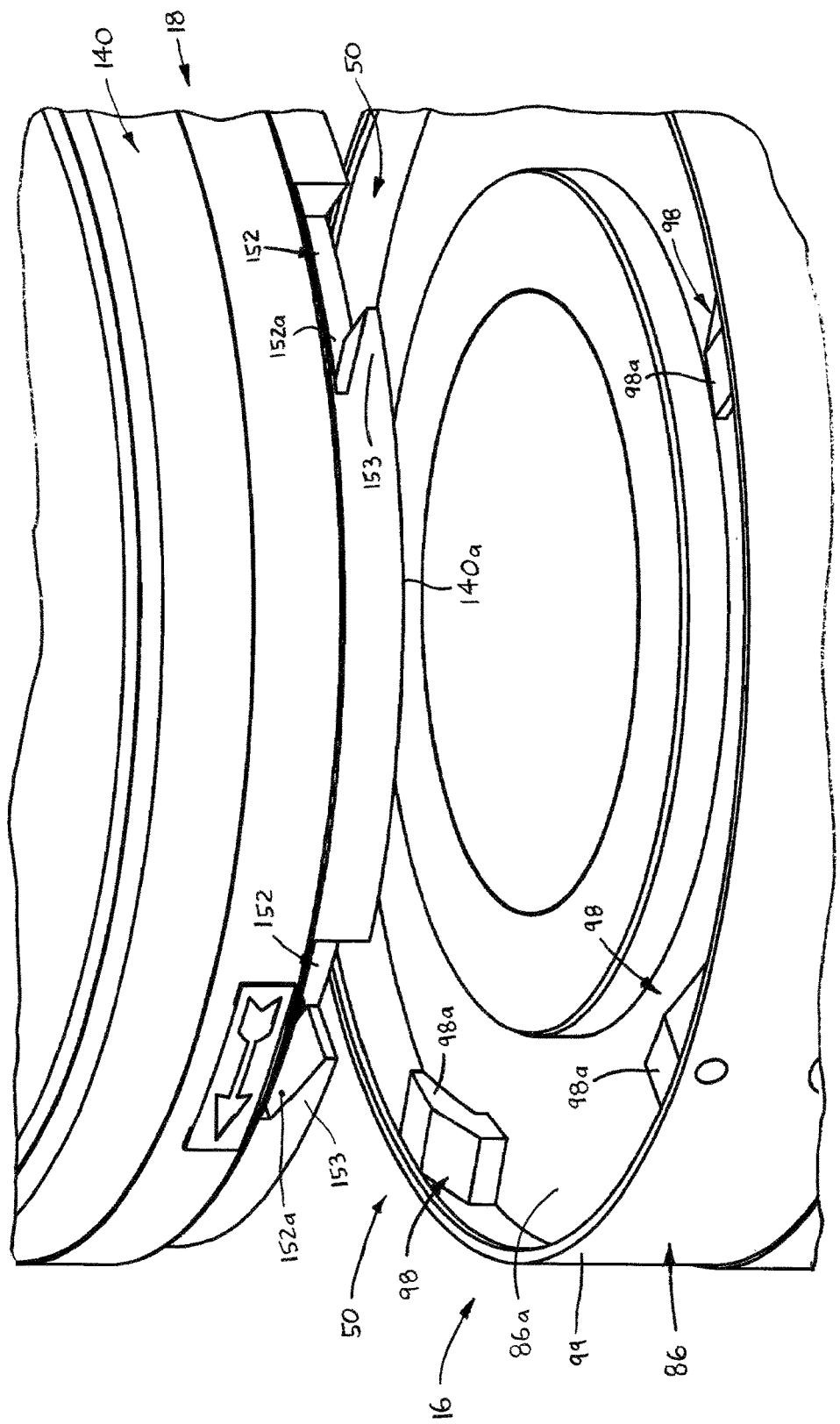
FIG. 13 is an enlarged view of a portion of FIG. 12, showing the details of the presently preferred connectors.
Figure 14:
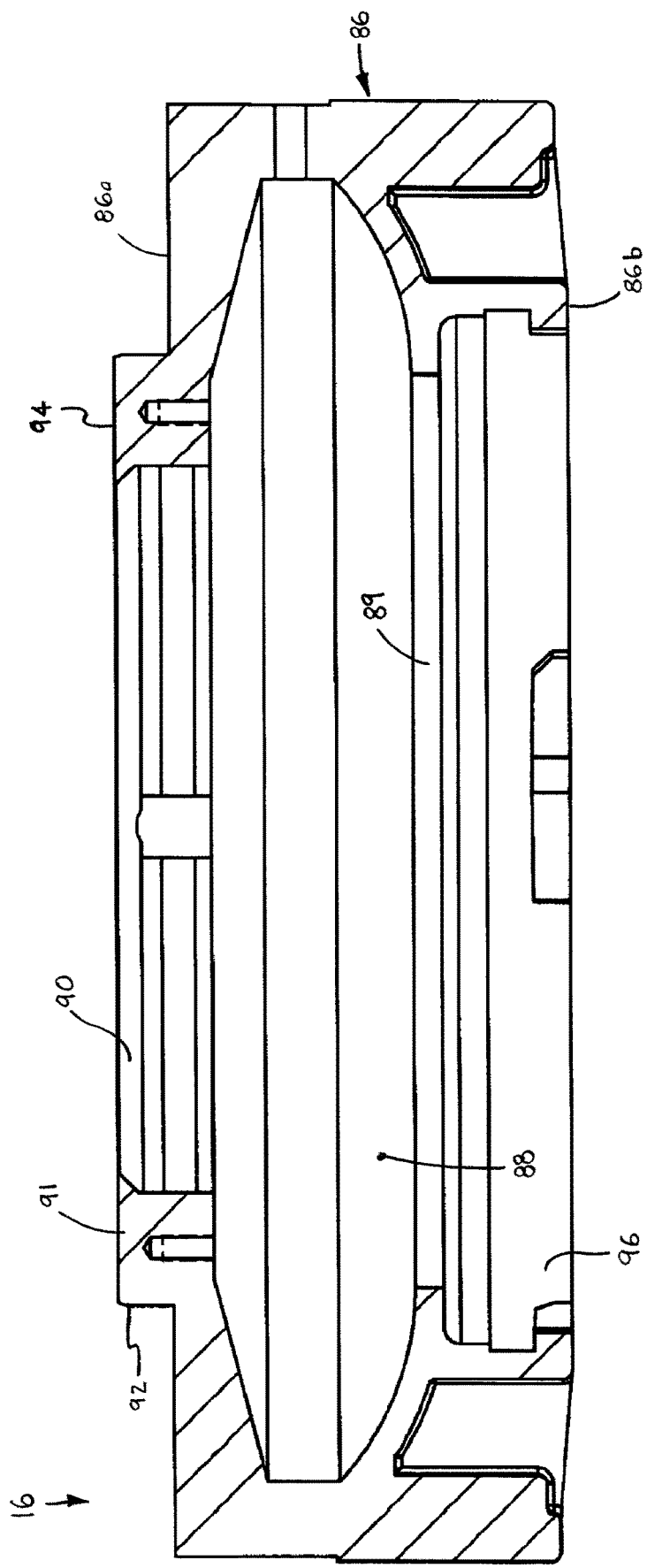
FIG. 14 is an axial cross-sectional view of a pump interface/adapter block.
Figure 15:
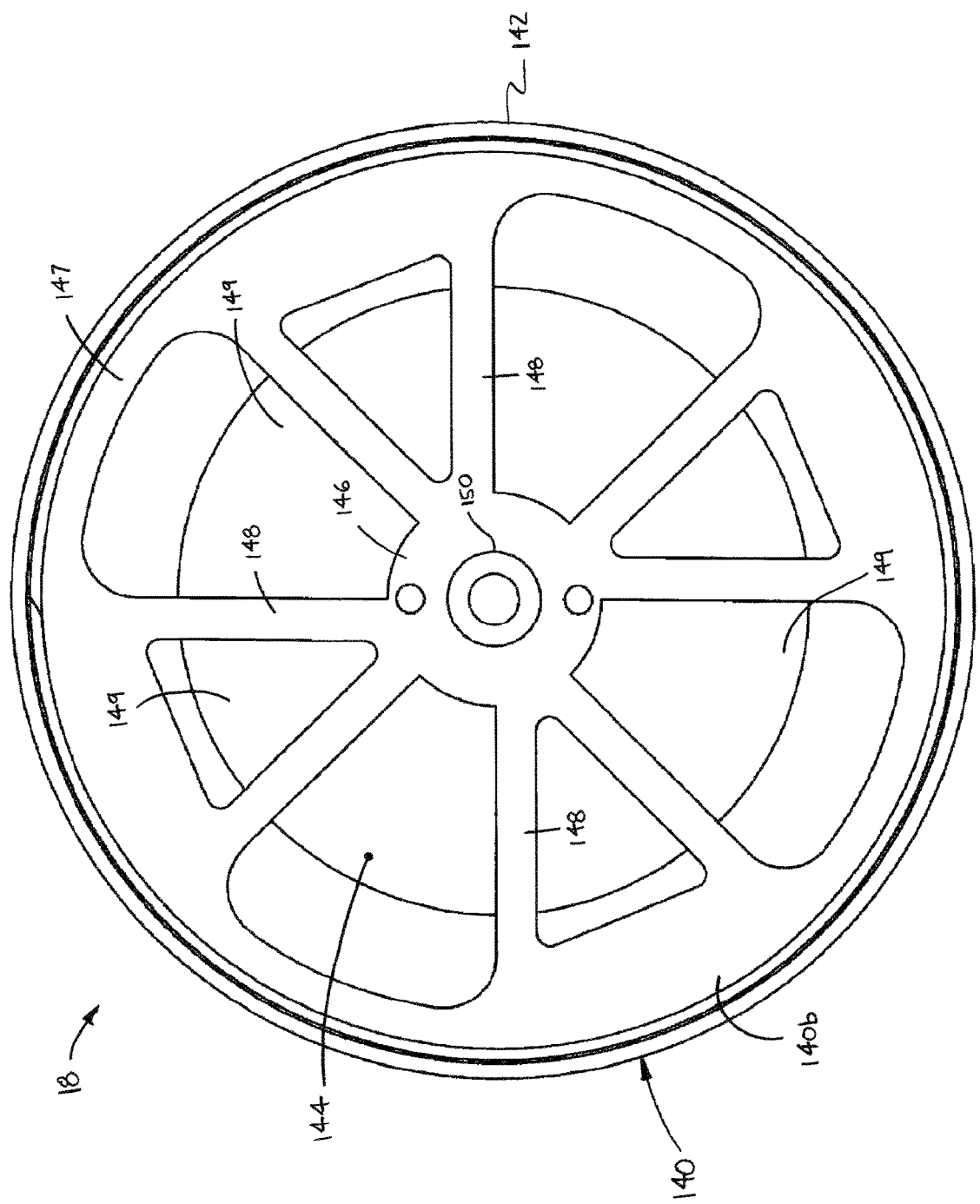
FIG. 15 is a top plan view of a reservoir interface/adapter block.
Figure 16:
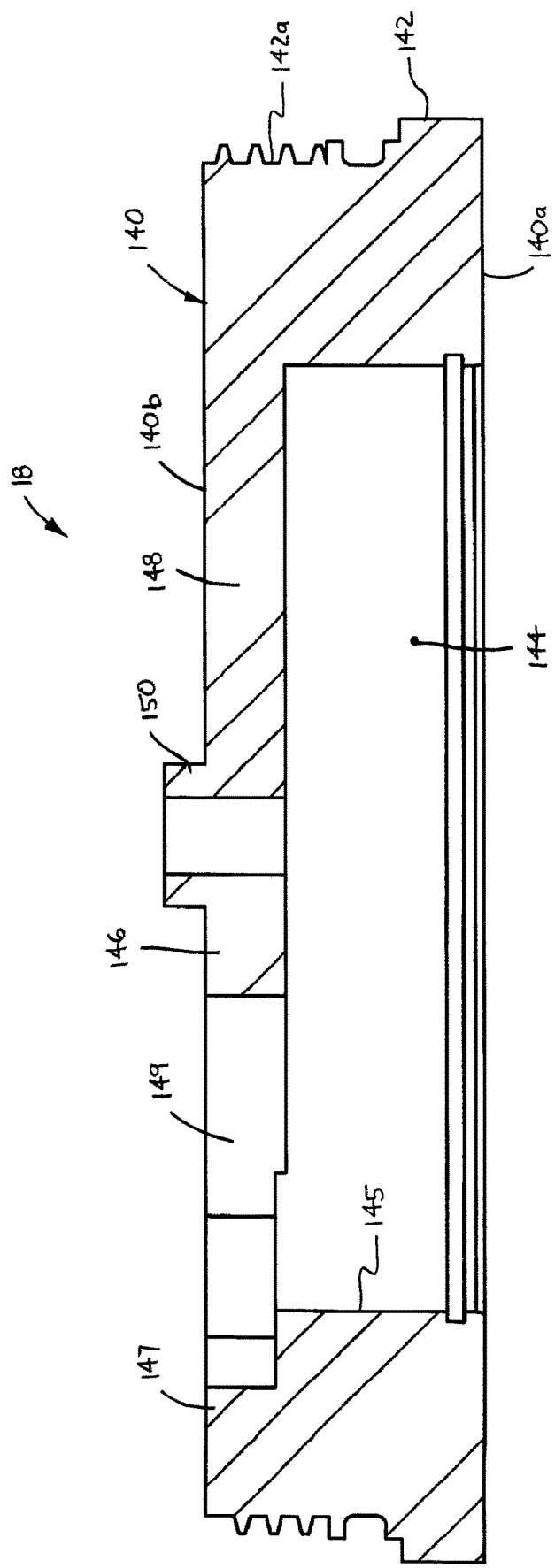
FIG. 16 is an axial cross-sectional view of the reservoir interface/adapter block.
Figure 17:
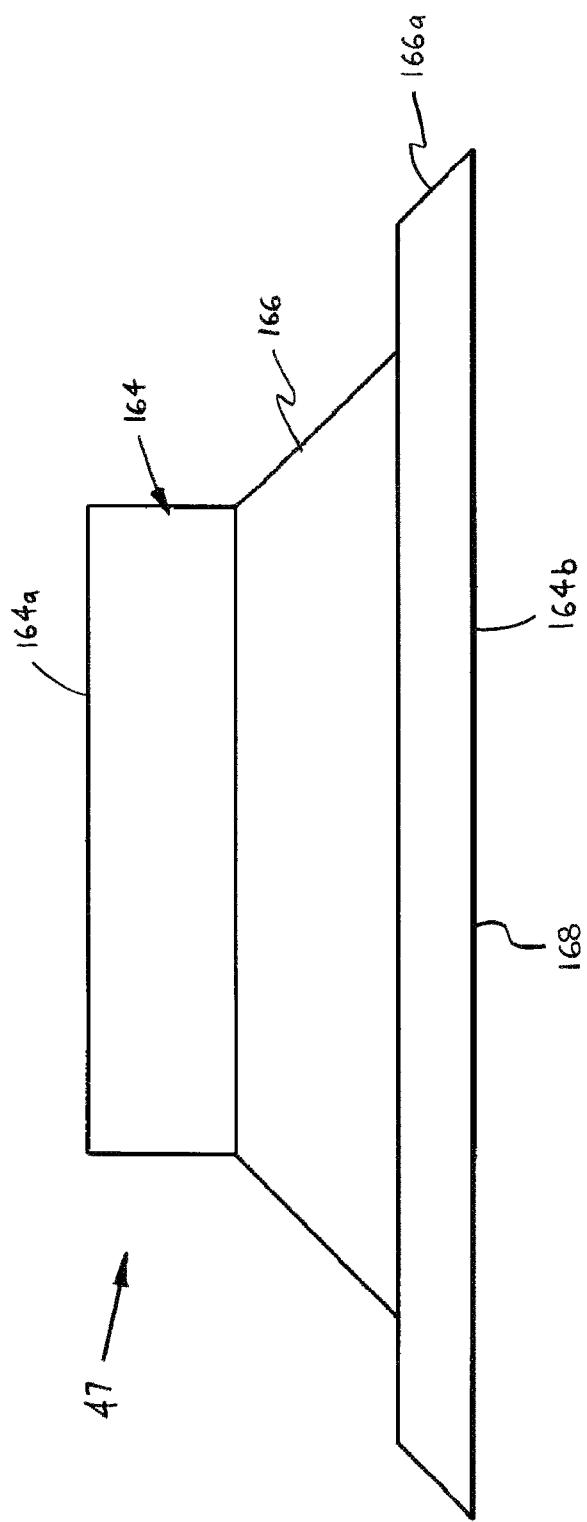
FIG. 17 is an axial cross-sectional view of a reservoir valve seat.

Referring to FIGS. 12 and 13, the pump interface block body 86 preferably includes at least one and preferably a plurality of L-shaped retainer tabs 98 projecting outwardly from and spaced circumferentially about the body outer axial end 86a adjacent to the body outer circumferential surface 87. Each retainer tab 98 is disposeable within a mating L-shaped recess 152 of the reservoir body 40 and has a wedge-shaped arm 98a engageable with the body 40 to provide one bayonet connector 50, as described above and in further detail below. Further, an annular rim 99 extends outwardly from the adapter block body outer end 86a so as to generally enclose the plurality of tabs 98, the rim 99 providing a section of the body outer circumferential surface 87.

Referring to FIGS. 7-10, the valve plug 37 of the pump valve 34 is movably disposed at least partially within the interior cavity 88 of the pump interface block 16. The plug 37 is configured to prevent flow from the interior cavity 88, or externally of the block 16 into the cavity 88, through the block outer axial end 80a when engaged with the valve seat 35. Preferably, the pump valve plug 37 includes a circular plate 100 with opposing axial ends 100a, 100b and is disposeable within the pump interface opening 32. The circular plate 100 has an outer circumferential surface 102 sealingly engageable with the valve seat inner circumferential surface 90 and a flat circular surface 104 on the outer axial end 100a. Further, the plug outer circumferential surface 102 preferably has an outer frustoconical surface section 102a which is disposable against the inner frustoconical surface 90 of the valve seat 35 to seal the pump interface opening 32, i.e., when urged by the biasing members 60. When the valve plug 37 is engaged with the valve seat 35, the valve plug circular surface 104 is substantially flush with the valve seat flat surface 94, i.e., the surfaces 94 and 104 are disposed within a common plane $VP_p$, as indicated in FIG. 7.

Preferably, the pump assembly 12 further includes a circular retainer plate 106 with a plurality of pockets 107 each containing a portion of one biasing member 60, which are each preferably formed as a compression coil spring. The retainer plate 106 includes a plurality of mounting tabs 108 connectable by fasteners (not shown) to an inner radial surface 88a partially defining the interior cavity 88. The pump assembly 12 also preferably includes a stirrer 110 disposed within the interior cavity 88 of the interface block 16 for circulating lubricant contained therein to thereby release any trapped air. The stirrer 110 preferably includes a central hub 112 attached to an outer end of the motor shaft 78a and a stirring paddle 114 extending radially from the hub 112, such that rotation of the motor shaft 78a, in addition to driving the cam 79, rotates the hub 112 to angularly displace the stirrer paddle 114 within the interior cavity 88.

Figure 2:
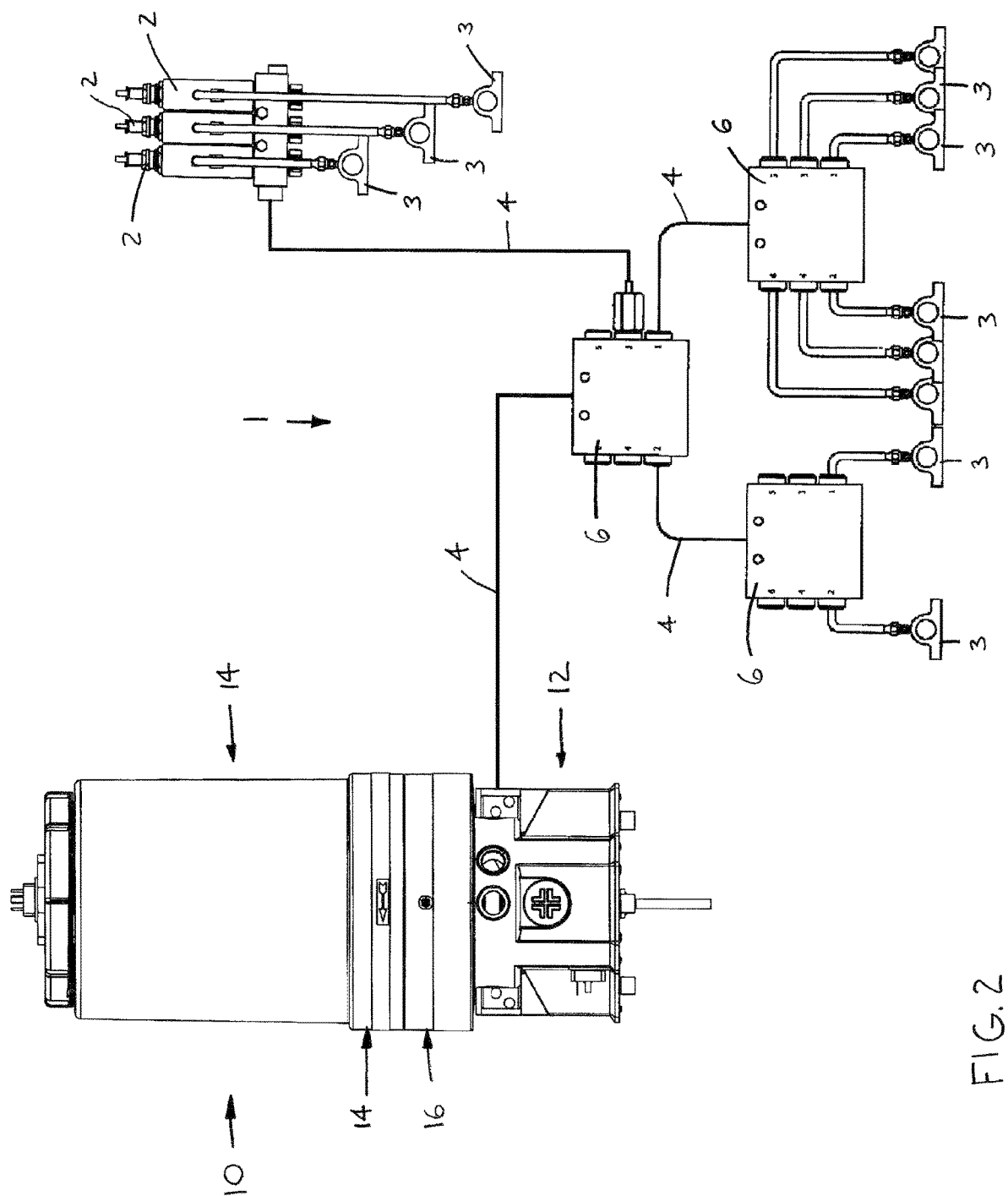
FIG. 2 is a schematic view of a lubrication system including the lubricant pump system.

Referring to FIGS. 1, 3 and 6, the reservoir body 40 preferably includes a tubular portion 120, which provides the lubricant storage chamber 42, and the reservoir interface block 18 as mentioned above. The body tubular portion 120 has a circular cylindrical sidewall 122 with opposing first and second axial ends 122a, 122b and an end cap 124 enclosing the first axial end 122a. As best shown in FIG. 3, the reservoir 14 includes a circular cylindrical follower 132 disposed within the storage chamber 42 and configured to rest upon a surface (not shown) of lubricant contained within the chamber 42. A guide rod 134 extends axially through the chamber 42 between the end cap 124 and the reservoir interface block 18 and through a central opening 133 of the follower 132. Further, the reservoir tubular portion 120 preferably has a threaded inner surface section 123 formed in the sidewall 122 and configured to threadably engage with a mating outer threaded surface section 142a of the reservoir interface block 18, as described below.

Referring to FIGS. 7-9, 15 and 16, the reservoir interface block 18 preferably includes a generally circular cylindrical body 140 having an outer axial end 140a providing the reservoir interface 44, an opposing inner axial end 140b, an outer circumferential surface 142, and an interior cavity 144 fluidly coupled with the storage chamber 42. Preferably, the outer surface 142 has the threaded section 142a threadably engaged with the threaded inner surface section 123 of the reservoir tubular portion 120, as discussed above. Thus, the tubular portion 120 and reservoir interface block 18 are releasably connected, such that the interface block 18 functions as an adapter block connectable to a conventional or commercially available reservoir. However, the interface block 18 and the tubular portion 120 of the reservoir body 40 may be connected in any other appropriate manner, either releasably or permanently, and/or specially fabricated as components of an integral design.

Further, the cylindrical body 140 of the reservoir block 18 preferably has an inner circumferential surface 145 extending inwardly from the body outer axial end 140a and at least partially defining the reservoir cavity 144. Adjacent to the body inner axial end 140b, the interface cylindrical body 140 preferably includes a central hub portion 146, an outer rim portion 147 and a plurality of radial spokes 148 spaced circumferentially about the reservoir central axis $A_{CR}$ and defining a plurality of generally triangular passages 149. Each passage 149 extends from the body inner axial end 140b to the interior cavity 144 and fluidly connect the reservoir storage chamber 42 with the cavity 144. Furthermore, a cylindrical projection 150 extends outwardly from the central hub portion 146 into the storage chamber 42 and receives an end 134a of the follower guide rod 134.

Referring again to FIGS. 12 and 13, as mentioned above, the reservoir interface block 18 preferably includes at least one and most preferably a plurality of recesses 152 with a generally triangular or wedge-shaped engagement section 152a spaced circumferentially about the reservoir central axis $A_{CR}$. Each recess 152 extends axially from the body outer axial end 140a and radially inwardly from the outer circumferential surface 142, with the engagement section 152a extending circumferentially from a remainder of the recess 152 so as to define a triangular/wedge-shaped retainer section 153. Further, each recess 152 is configured to receive a separate one of the L-shaped tabs 98 of the pump interface block 16 when the reservoir 14 is displaced axially into engagement with the pump assembly 12.

Specifically, the reservoir block outer axial end 140a becomes disposed within the pump block annular rim 99 and each tab 98 enters a separate recess 152 when the reservoir interface 44 engages with the pump interface 30, to open the valves 34, 48, and then the reservoir 14 is angularly displaced or turned about the central axis $A_C$ through a limited angular displacement or fractional turn. Such angular displacement/turning engages the arm 98a of each tab 98 of the pump interface block 16 with the retainer section 153 formed by a separate recess 152 of the reservoir interface block 18 to releasably connect the reservoir 14 with the pump assembly 12 without requiring the use of any tools. However, the reservoir 14 may be releasably coupled with the pump assembly 12 to maintain engagement of the pump and reservoir interfaces 30, 44, respectively, by any other appropriate means, such as for example, one or more clamps, etc.

Referring now to FIGS. 7-10 and 17, the reservoir valve plug 49 is movably disposed at least partially within the interior cavity 144 of the reservoir interface block 18. The plug 49 is configured to prevent flow from the interior cavity 144 through the interface block outer axial end 140a when engaged with the reservoir valve seat 47. Preferably, the valve plug 49 includes an annular body 154 with an inner circumferential surface 155, an outer circumferential surface 156, and opposing inner and outer circular/annular end surfaces 157A, 157B, respectively. The outer circumferential surface 155 is sealingly engaged with the inner circumferential surface 145 of the interior cavity 144 and the inner circumferential surface 155 defines the reservoir interface opening 46 and is sealingly engageable with the valve seat 49. Specifically, the inner surface 155 has a frustoconical surface section 155a engageable with the valve seat 47 as described below. Further, at least the outer axial end surface 157B is a substantially flat and is contactable by the flat circular surface 94 of the pump valve seat 35, for reasons discussed below.

As best shown in FIG. 7, the reservoir interface block 18 preferably includes an annular spring retainer 160 disposed within the interior cavity 144 and having a plurality of pockets 162 (one shown) each retaining a portion of one of the biasing members 62, which are each preferably formed as a compression coil spring. The spring retainer 160 is disposed against the radial spokes 148 of the interface block cylindrical body 140 and retained axially by the force exerted by the biasing members 62.

Referring again to FIGS. 7-10 and 17, the reservoir valve seat 47 preferably includes a cylindrical body 164 disposed within the interior cavity 144 of the reservoir interface block 18. The cylindrical body 164 of the valve seat 47 has an outer circumferential surface 166, an inner axial end 164a disposed against the central hub portion 146 of the cylindrical body 140, and an outer axial end 160b with a flat circular surface 168 generally flush with the outer axial end 140a of the body 140 of the reservoir interface block 18. Preferably, the outer circumferential surface 166 has a frustoconical surface section 166a contactable by, and sealingly engageable with, the frustoconical inner surface section 155a of the valve plug 49 to seal the reservoir interface opening 46. With the engaging inner and outer frustoconical surfaces 155a, 166a, the valve seat 47 prevents axial displacement of the valve plug 49 out of the interior cavity 144 of the reservoir interface block 18. When the valve plug 49 is engaged with the valve seat 47, the valve plug annular surface 157B is substantially flush with the valve seat flat circular surface 168, i.e., the surfaces 157B and 168 are disposed within a common plane $VP_R$, as indicated in FIG. 7. Also, the flat outer circular surface 168 of the reservoir valve seat 47 is configured to contact the flat circular surface 104 of the pump valve plug 37 during engagement of the reservoir and pump interfaces 30, 44, as discussed below.

Referring to FIGS. 4, 7-10, 12 and 13, with the above-described preferred structures of the pump assembly 12 and the reservoir 14, particularly the respective interface blocks 16, 18 thereof, the present lubricant pump 10 is rapidly and conveniently refilled with lubricant generally in the following manner. When the quantity of lubricant contained within the reservoir storage chamber 42 has been depleted, the empty reservoir 14 is first uninstalled from the pump assembly 12. Preferably, the reservoir 14 is removed from the pump assembly 12 by a limited angular displacement or fractional turn of the reservoir 14, such that each retainer tab 98 of the pump assembly 12 is withdrawn from the associated retainer recess 152 of the reservoir 14. As the reservoir interface block 18 uncouples from the pump interface block 16, the pump valve 34 closes the pump interface opening 32 and the reservoir valve 48 simultaneously closes the reservoir interface opening 46, so as thereby prevent any residual lubricant from escaping from the pump assembly 12 or from the reservoir 14, and also prevents air from entering into each interface block 16, 18.

Figure 8:
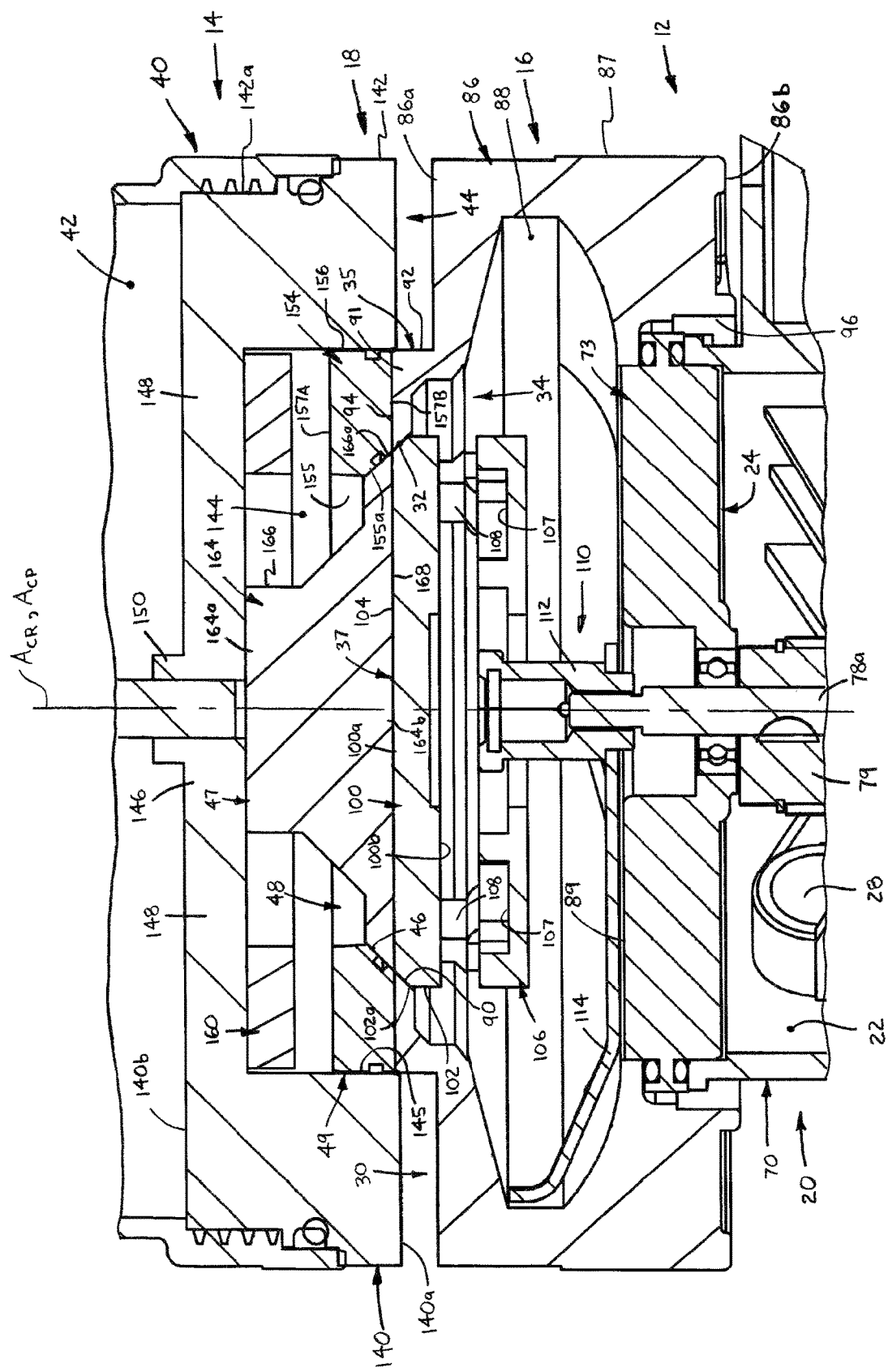
FIG. 8 is a broken-away, enlarged axial cross-sectional view of the lubricant pump, showing an initial engagement of the reservoir interface with the pump interface.

Then, another reservoir 14 with a filled storage chamber 42 is conveyed to the pump assembly 12 and positioned such that the reservoir interface 44 is adjacent to the pump interface 30, as shown in FIG. 7. The reservoir 14 is then displaced axially toward the pump assembly 12 (i.e., along the coaxial central axes $A_{CR}$, $A_{CP}$) such that the reservoir valve plug 49 contacts the pump valve seat 35 and the reservoir valve seat 47 contacts the pump valve plug 37, as depicted in FIG. 8. Due to the contacting flat surfaces 94, 157B of the pump valve seat 35 and the reservoir valve plug 49, respectively, and the contacting flat surfaces 104, 168 of the pump valve plug 37 and the reservoir valve seat 47, respectively, air is pushed out of the space between the reservoir 14 and the pump assembly 12 when the reservoir interface 44 is displaced into engagement with the pump interface 30.

Figure 9:
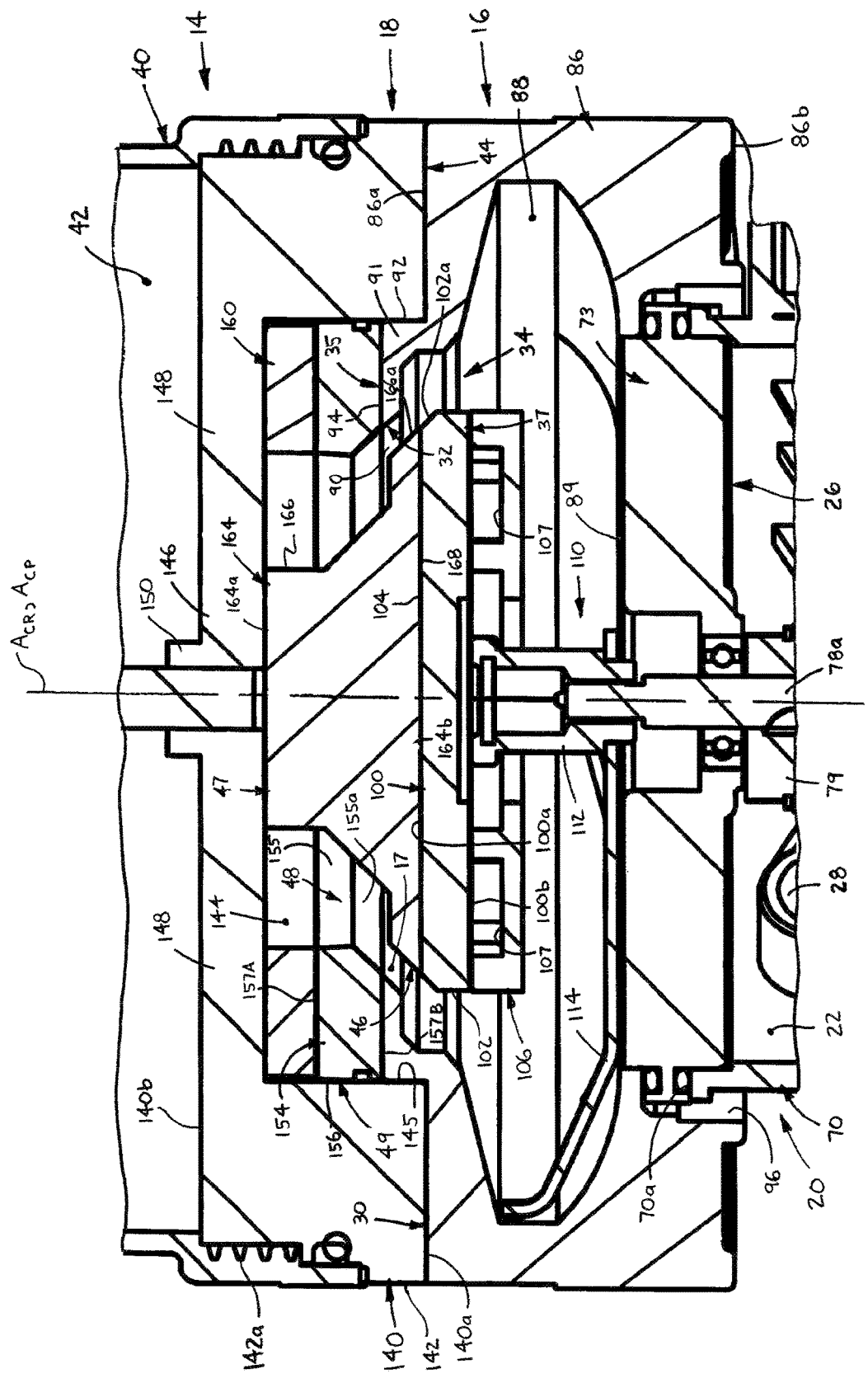
FIG. 9 is a broken-away, enlarged axial cross-sectional view of the lubricant pump, showing a full engagement of the reservoir interface with the pump interface.

As the reservoir interface 44 is further displaced axially into engagement with the pump interface 30, the pump fixed valve seat 35 displaces the reservoir movable valve plug 49 axially into the interior cavity 144 of the reservoir interface block 18 as the pump valve seat 35 also becomes disposed within the reservoir cavity 144, as shown in FIGS. 9 and 10. Simultaneously, the reservoir fixed valve seat 47 displaces the pump movable valve plug 37 axially into the interior cavity 88 of the pump interface block 16 as the reservoir valve seat 47 enters the pump cavity 88 and a portion of the valve seat 47 becomes disposed within the pump valve seat 35. As such, the annular passage 17 becomes defined between the frustoconical inner circumferential surface 90 of the pump valve seat 35 and the frustoconical outer circumferential surface section 166a of the reservoir valve seat 47, thereby fluidly coupling the interior cavity 144 of the reservoir interface block 18 and the interior cavity 88 of the pump interface block 16, and thus the reservoir storage chamber 42 with the pumping chamber 22. Finally, the reservoir 14 is turned/rotated about the reservoir central axis $A_{CR}$ to engage the pump retainer tabs 98 with the reservoir recesses 152 and thereby releasably connect the reservoir 14 with the pump assembly 12.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A lubricant pump system comprising:
   a pump assembly including a housing with a central axis, an interior pumping chamber having an inlet and at least one pumping unit disposed at least partially within the pumping chamber and configured to displace lubricant from the pumping chamber through an outlet, the housing having a pump interface with an opening fluidly coupleable with the pumping chamber inlet and a pump valve controlling lubricant flow through the pump interface opening; and
   a reservoir including a body connectable with the housing and having a central axis, an interior storage chamber for containing a quantity of lubricant and a reservoir interface engageable with the pump interface, the reservoir interface including an opening fluidly coupleable with the storage chamber and fluidly coupleable with the pump interface opening, the reservoir body including a reservoir valve controlling lubricant flow through the reservoir interface opening;

wherein the pump valve includes a fixed valve seat and a movable valve plug engageable with the pump valve seat so as to close the pump interface opening and the reservoir valve includes a fixed valve seat and a movable valve plug engageable with the reservoir valve seat so as to close the reservoir interface opening, the reservoir valve plug contacting the pump valve seat and the reservoir valve seat contacting the pump valve plug when the reservoir interface engages with the pump interface such that relative displacement of the reservoir toward the pump assembly displaces both the reservoir valve plug and the pump valve plug generally along the central axis of the housing and fluidly couples the reservoir chamber with the pumping chamber.

2. The lubricant pump system as recited in claim 1 wherein:
the pump valve seals the pump interface opening and the reservoir valve seals the reservoir interface opening when the reservoir is separate from the pump; and
the reservoir valve interacts with the pump valve when the reservoir interface engages with the pump interface so as to open the pump interface opening and the reservoir interface opening to fluidly connect the reservoir storage chamber with the pumping chamber.

3. The lubricant pump system as recited in claim 1 wherein at least one of the pump assembly and the reservoir includes at least one connector configured to releasably connect the reservoir with the pump assembly.

4. The lubricant pump system as recited in claim 1 wherein an annular passage is defined between the reservoir valve seat and the pump valve seat when the reservoir body is connected with the housing, the annular passage fluidly coupling the reservoir storage chamber with the pumping chamber.

5. The lubricant pump system as recited in claim 1 wherein:
the pump valve further includes at least one biasing member configured to bias the pump valve plug axially against the pump valve seat so as to prevent lubricant flow through the pump valve seat when the pump assembly is separate from the reservoir; and
the reservoir valve further includes at least one biasing member configured to bias the reservoir valve plug axially against the reservoir valve seat so as to prevent lubricant flow through the reservoir valve seat when the reservoir is separate from the pump assembly.

6. The lubricant pump system as recited in claim 1 wherein the pump valve seat has a flat outer annular surface contactable with a flat outer annular surface of the reservoir valve plug and the pump valve plug has a flat circular surface contactable with a flat circular surface of the reservoir valve seat such that air is pushed out of a space between the reservoir and the pump assembly as the reservoir interface displaces into engagement with the pump interface.

7. The lubricant pump system as recited in claim 1 wherein:
the housing includes a main body portion, the main body portion providing the pumping chamber and containing the at least one pumping unit, and an interface block attached to the main body portion and having an outer axial end providing the pump interface and an interior cavity fluidly coupled with the pump inlet, the pump valve plug being movably disposed at least partially within the cavity of the pump interface block and configured to prevent flow from the interior cavity through the outer axial end of the pump interface block when engaged with the pump valve seat; and
the reservoir body includes a tubular portion providing the lubricant storage chamber and an interface block attached to the tubular portion and having an outer axial end providing the reservoir interface and an interior cavity fluidly coupled with the storage chamber, the reservoir valve plug being movably disposed at least partially within the interior cavity of the reservoir interface block and configured to prevent flow from the interior cavity through the interface block outer axial end when engaged with the reservoir valve seat, the reservoir interface block being releasably attachable to the pump interface block to connect the reservoir with the pump assembly.

8. The lubricant pump system as recited in claim 7 wherein:
the pump interface block has an inner circumferential surface extending axially inwardly from the outer axial end of the pump interface block, the inner circumferential surface defining the pump interface opening and providing the pump valve seat, and the pump valve plug includes a circular plate disposeable within the pump interface opening and having an outer circumferential surface sealingly engageable with the valve seat inner circumferential surface; and
the reservoir interface block includes an inner circumferential surface at least partially defining the reservoir cavity, the reservoir valve seat includes a cylindrical body disposed within the interior cavity of the reservoir interface block and having an outer circumferential surface, and the reservoir valve plug includes an annular body disposed within the interior cavity of the reservoir interface block and about the reservoir valve seat cylindrical body, the valve plug annular body having an outer circumferential surface sealingly engaged with the inner circumferential surface of the reservoir interface block and an inner circumferential surface defining the reservoir interface opening and being sealingly engageable with the outer circumferential surface of the reservoir valve seat.

9. The lubricant pump system as recited in claim 8 wherein the pump interface block has an annular projection extending from the block outer axial end and providing the valve seat, the inner circumferential surface of the pump interface block being provided on the annular projection, the annular projection being disposeable within the reservoir block cavity when the reservoir interface engages with the pump interface.

10. The lubricant pump system as recited in claim 8 wherein a portion of the reservoir valve seat is disposed within the pump valve seat when the reservoir interface is engaged with the pump interface such that an annular passage is defined between the outer circumferential surface of the reservoir valve seat and the inner circumferential surface of the pump valve seat, the annular passage fluidly coupling the interior cavity of the reservoir interface block and the interior cavity of the pump interface block.

11. The lubricant pump system as recited in claim 7 wherein:
the pump valve further includes at least one biasing member disposed within the cavity of the pump interface block and configured to bias the pump valve plug axially toward the outer axial end of the pump interface block and against the pump valve seat so as to prevent lubricant flow through the pump interface opening when the pump assembly is separate from the reservoir; and the reservoir valve further includes at least one biasing member disposed within the cavity of the reservoir interface block and configured to bias the reservoir valve plug axially toward the outer axial end of the reservoir interface block and against the reservoir valve seat so as to prevent lubricant flow through the reservoir interface opening when the reservoir is separate from the pump assembly.

12. The lubricant pump system as recited in claim 7 wherein the at least one pumping unit includes a motor with a shaft, an eccentric drive member disposed on the motor shaft and within the pumping chamber, a cylindrical sleeve having a central passage, an inlet disposed within the pumping chamber and an outlet providing the pump outlet, and a piston slidably disposed within the sleeve central passage and engageable by the eccentric drive member such that rotation of the drive member reciprocates the piston within the sleeve so as to direct lubricant entering the sleeve inlet through the sleeve outlet.

13. The lubricant pump system as recited in claim 12 wherein the pump further includes a stirrer attached to the motor shaft and disposed within the interior cavity of the pump interface block such that rotation of the motor shaft angularly displaces the stirrer within the interior cavity.

14. A lubricant pump system comprising:
a pump assembly including a housing with a central axis, an interior pumping chamber having an inlet and at least one pumping unit disposed at least partially within the pumping chamber and configured to displace lubricant from the pumping chamber through an outlet, the housing having a pump interface with an opening fluidly coupleable with the pumping chamber inlet and a pump valve controlling lubricant flow through the pump interface opening and including a fixed valve seat and a movable valve plug; and a reservoir including a body connectable with the housing and having a central axis, an interior storage chamber for containing a quantity of lubricant and a reservoir interface engageable with the pump interface, the reservoir interface including an opening fluidly coupleable with the storage chamber and fluidly coupleable with the pump interface opening, the reservoir body having a reservoir valve controlling lubricant flow through the reservoir interface opening and including a fixed valve seat and a movable valve plug, the reservoir valve plug contacting the pump valve seat and the reservoir valve seat contacting the pump valve plug when the reservoir interface engages with the pump interface such that relative displacement of the reservoir toward the pump assembly displaces both the reservoir valve plug and the pump valve plug generally along the central axis of the housing and fluidly couples the reservoir storage chamber with the pumping chamber.

15. The lubricant pump system as recited in claim 14 wherein:
the pump valve seals the pump interface opening and the reservoir valve seals the reservoir interface opening when the reservoir is separate from the pump; and the reservoir valve interacts with the pump valve when the reservoir interface engages with the pump interface so as to open the pump interface opening and the reservoir interface opening to fluidly couple the reservoir chamber with the pump inlet.

16. The lubricant pump as recited in claim 14 further comprising at least one connector configured to releasably connect the reservoir with the pump assembly.

17. The lubricant pump system as recited in claim 14 wherein:
the housing includes a main body portion, the main body portion providing the pumping chamber and containing the at least one pumping unit, and an interface block attached to the main body portion and having an outer axial end providing the pump interface and an interior cavity fluidly coupled with the pump inlet, the pump valve plug being movably disposed at least partially within the cavity of the pump interface block and configured to prevent flow from the interior cavity through the pump interface opening when engaged with the pump valve seat; and the reservoir body includes a tubular portion providing the lubricant storage chamber and an interface block having an inner axial end attached to tubular portion, an outer axial end providing the reservoir interface, and an interior cavity fluidly coupled with the storage chamber, the reservoir valve plug being movably disposed at least partially within the interior cavity of the reservoir interface block and configured to prevent flow from the interior cavity through the reservoir interface opening when engaged with the reservoir valve seat, the reservoir interface block being releasably attachable to the pump interface block to connect the reservoir with the pump assembly.

18. The lubricant pump system as recited in claim 17 wherein:
the pump interface block has an inner circumferential surface extending axially inwardly from the outer axial end of the pump interface block, the inner circumferential surface defining the pump interface opening and providing the pump valve seat, and the pump valve plug includes a circular plate disposeable within the pump interface opening and having an outer circumferential surface sealingly engageable with the valve seat inner circumferential surface; and the reservoir interface block includes an inner circumferential surface at least partially defining the reservoir cavity, the reservoir valve seat includes a cylindrical body disposed within the interior cavity of the reservoir interface block and having an outer circumferential surface, and the reservoir valve plug includes an annular body disposed within the interior cavity of the reservoir interface block and about the reservoir valve seat cylindrical body, the valve plug annular body having an outer circumferential surface sealingly engaged with the inner circumferential surface of the reservoir interface block and an inner circumferential surface defining the reservoir interface opening and being sealingly engageable with the outer circumferential surface of the reservoir valve seat.

\* \* \* \* \*